United States Patent
Mann

(10) Patent No.: US 9,514,309 B1
(45) Date of Patent: Dec. 6, 2016

(54) SYSTEMS AND METHODS FOR PROTECTING FILES FROM MALICIOUS ENCRYPTION ATTEMPTS

(71) Applicant: Symantec Corporation, Mountain View, CA (US)

(72) Inventor: Uri Mann, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 14/265,948

(22) Filed: Apr. 30, 2014

(51) Int. Cl.
*G06F 21/60* (2013.01)
*G06F 21/56* (2013.01)

(52) U.S. Cl.
CPC ............... *G06F 21/60* (2013.01); *G06F 21/56* (2013.01)

(58) Field of Classification Search
CPC ............ G06F 2221/2101; G06F 2221/2145; G06F 2221/2141; G06F 2221/2115; G06F 2221/2147; G06F 21/54; G06F 21/55; G06F 21/56; G06F 21/565; G06F 12/14; G06F 15/18; G06F 17/30; H04L 63/145; H04L 63/1416; H04L 2209/60
USPC .............. 726/22–28; 713/187–189; 707/781, 707/999.2, E17.005
See application file for complete search history.

(56) References Cited

U.S. PATENT DOCUMENTS

| | | | | |
|---|---|---|---|---|
| 7,421,136 B2 * | 9/2008 | Sirohey | ................. | G06T 3/4092 375/E7.013 |
| 7,472,420 B1 * | 12/2008 | Pavlyushchik | ......... | G06F 21/55 707/999.2 |
| 8,104,090 B1 * | 1/2012 | Pavlyushchik | ......... | G06F 21/55 713/188 |
| 8,522,346 B1 * | 8/2013 | Harris | ................. | G06F 21/6218 726/23 |
| 8,590,041 B2 * | 11/2013 | Brinkley | ............... | G06F 21/566 726/22 |
| 2002/0174349 A1 * | 11/2002 | Wolff | .................... | G06F 21/565 713/188 |

* cited by examiner

*Primary Examiner* — Thanhnga B Truong
(74) *Attorney, Agent, or Firm* — Fisherbroyles, LLC

(57) ABSTRACT

A computer-implemented method for protecting files from malicious encryption attempts may include (1) detecting an attempt to alter a file, (2) identifying at least one characteristic of the attempt to alter the file, (3) determining, based on the characteristic of the attempt to alter the file, that the attempt to alter the file represents a malicious attempt by a third party to encrypt the file, and (4) performing a security action in response to determining that the attempt to alter the file represents a malicious attempt by the third party to encrypt the file. Various other methods, systems, and computer-readable media are also disclosed.

20 Claims, 7 Drawing Sheets

SYSTEMS AND METHODS FOR PROTECTING FILES FROM MALICIOUS ENCRYPTION ATTEMPTS

BACKGROUND

The variety of malware on the Internet is ever-growing. One such variant of malware is ransomware, which attempts to encrypt important files on a user's computing system and then hold the encrypted files for ransom. If the user does not pay the ransom, the important files remain encrypted and may be impossible for the user to access. Unfortunately, the encryption of important files may result in data loss and/or may compromise functionality on the computing system. In addition, paying the ransom can also introduce other problems since the malicious developers now have access to the user's payment information.

Traditional security systems are often designed to prevent malware from being inadvertently installed by a user, but may have no means of detecting or removing malware once it has been installed. Moreover, even if a conventional security systems is able to remove installed ransomware, it may be too late since the user's files have already been encrypted. Accordingly, the instant disclosure identifies and addresses a need for additional and improved systems and methods for protecting files from malicious encryption attempts.

SUMMARY

As will be described in greater detail below, the instant disclosure generally relates to systems and methods for protecting files from malicious encryption attempts by intercepting attempts to edit files, determining whether the attempts represent malicious encryption attempts caused by ransomware, and performing a security action to protect the files from malicious encryption. In one example, a computer-implemented method for performing such a task may include (1) detecting an attempt to alter a file, (2) identifying a characteristic of the attempt to alter the file, (3) determining, based on the characteristic of the attempt to alter the file, that the attempt to alter the file represents a malicious attempt by a third party to encrypt the file, and (4) performing a security action in response to determining that the attempt to alter the file represents a malicious attempt by the third party to encrypt the file.

The security action may take a variety of forms. In some examples, performing the security action may include (1) blocking the malicious attempt by the third party to encrypt the file, (2) creating a backup copy of the file targeted by the malicious attempt, and/or (3) alerting a user to the malicious attempt to encrypt the file.

In one embodiment, the malicious attempt by the third party to encrypt the file may include an attempt to prevent a legitimate user from accessing the file. For example, ransomware may attempt to encrypt files in order to prevent legitimate users from accessing the files until a ransom is paid.

The systems described herein may detect the attempt to alter the file in a variety of ways. In some examples, detecting the attempt to alter the file may include intercepting the attempt to alter the file using a device driver. Additionally or alternatively, detecting the attempt to alter the file may include intercepting the attempt to alter the file using a user-mode interception hook.

The systems described herein may also identify the characteristic of the attempt to alter the file in a variety of ways.

In one embodiment, identifying the characteristic of the attempt to alter the file may include identifying an original entropy level of content of the file. In this embodiment, determining that the attempt to alter the file may be the malicious attempt may include determining that the attempt to alter the file introduces a high level of entropy to the content that is greater than the original entropy level of the content of the file.

In some examples, the characteristic may include the file's type. For example, identifying the characteristic of the attempt to alter the file may include identifying the file's type and determining that the attempt to alter the file is malicious may include determining that an editor performing the attempt to alter the file is not commonly associated with the file's type and/or is untrusted. In one example, identifying the characteristic of the attempt to alter the file may include identifying the file's type and determining that the attempt to alter the file is malicious may include determining that the attempt to alter the file is not consistent with the file's type.

Additionally or alternatively, the characteristic may include the section and/or proportion of the file being edited. In some embodiments, identifying the characteristic of the attempt to alter the file may include identifying a proportion of the file affected by the attempt to alter the file and determining that the attempt to alter the file is malicious may include determining that the proportion of the file exceeds a predetermined threshold for proportions of the file affected by benign attempts to alter the file. In some embodiments, identifying the characteristic of the attempt to alter the file may include determining that the attempt includes an alteration of a header of the file.

Additionally or alternatively, identifying the characteristic of the attempt to alter the file may include identifying the file's size. In this example, determining that the attempt to alter the file is malicious may include determining that the attempt to alter the file would change the file's size by a predictable delta associated with an encryption scheme.

In one embodiment, a system for implementing the above-described method may include (1) a detection module, stored in memory, that detects an attempt to alter a file, (2) an identification module, stored in memory, that identifies a characteristic of the attempt to alter the file, (3) a determination module, stored in memory, that determines, based on the characteristic of the attempt to alter the file, that the attempt to alter the file represents a malicious attempt by a third party to encrypt the file, (4) a security module, stored in memory, that performs a security action in response to determining that the attempt to alter the file represents a malicious attempt by the third party to encrypt the file, and (5) at least one physical processor configured to execute the detection module, the identification module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect an attempt to alter a file, (2) identify a characteristic of the attempt to alter the file, (3) determine, based on the characteristic of the attempt to alter the file, that the attempt to alter the file represents a malicious attempt by a third party to encrypt the file, and (4) perform a security action in response to determining that the attempt to alter the file represents a malicious attempt by the third party to encrypt the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
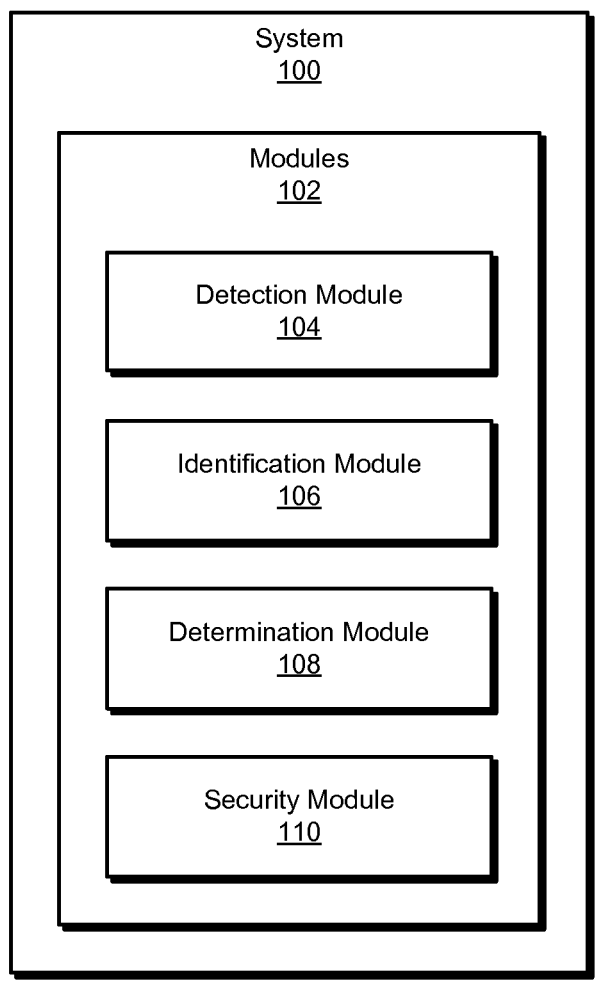
FIG. 1 is a block diagram of an exemplary system for protecting files from malicious encryption attempts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting files from malicious encryption attempts. As will be explained in greater detail below, by monitoring attempts to edit files and performing security actions on attempts that are determined to be malicious, the systems described herein may prevent ransomware from successfully encrypting files. Detecting ransomware in this way may prevent malicious applications from causing harm to users' computing systems and may also prevent users from having to pay a ransom or else risk losing access to important files.

Figure 2:
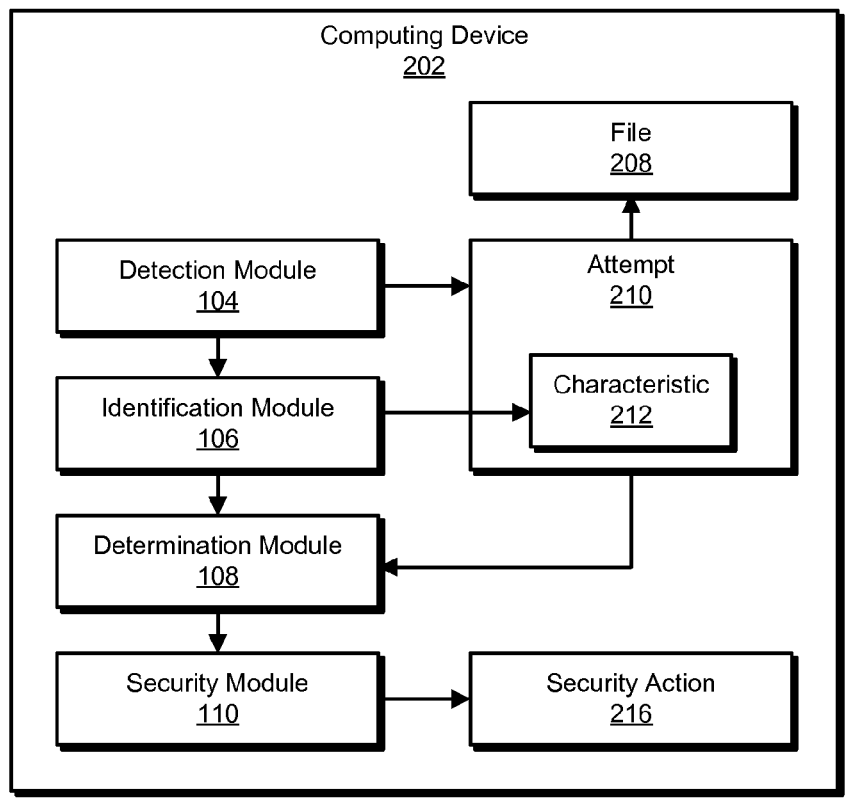
FIG. 2 is a block diagram of an additional exemplary system for protecting files from malicious encryption attempts.
Figure 3:
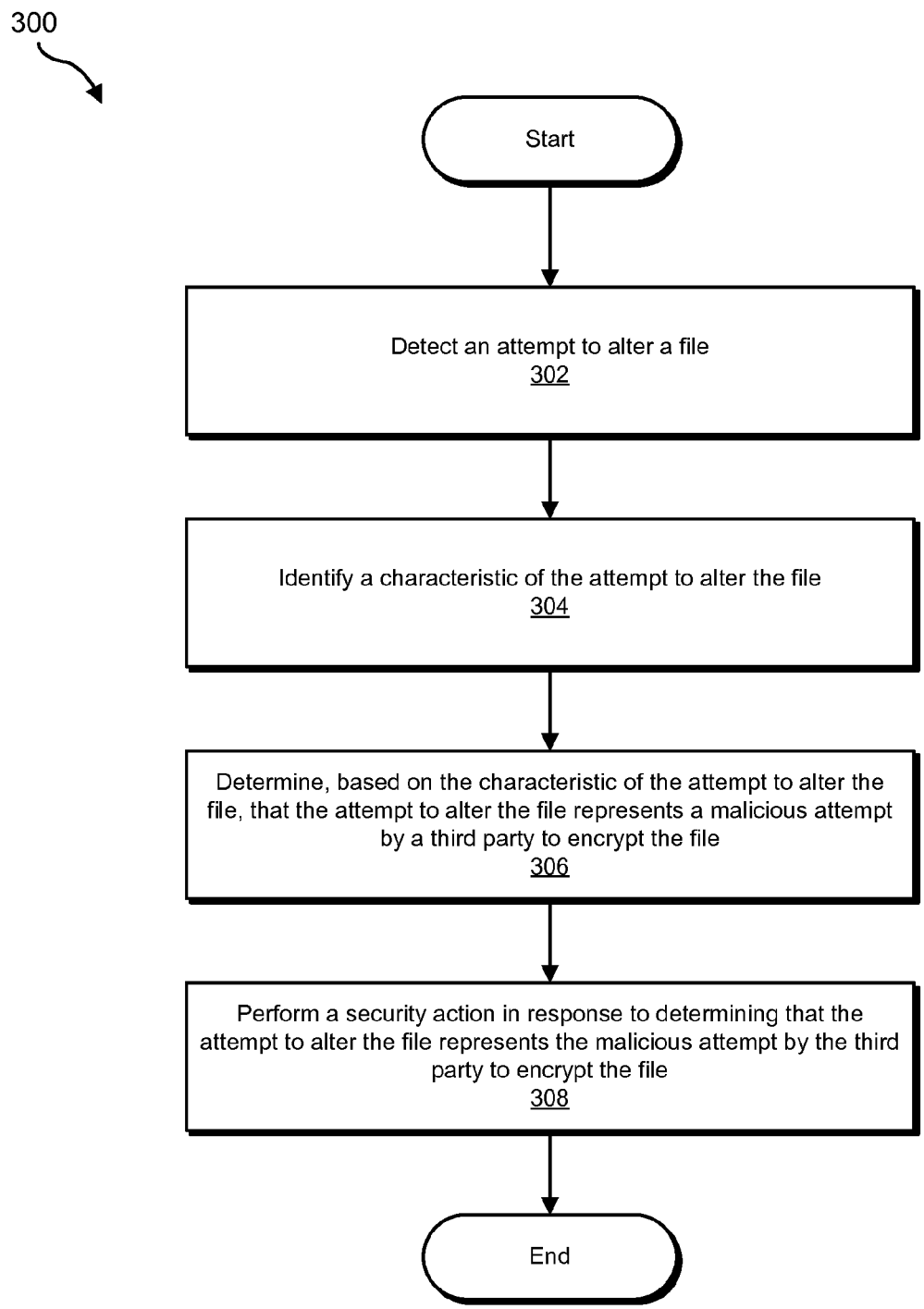
FIG. 3 is a flow diagram of an exemplary method for protecting files from malicious encryption attempts.
Figure 4:
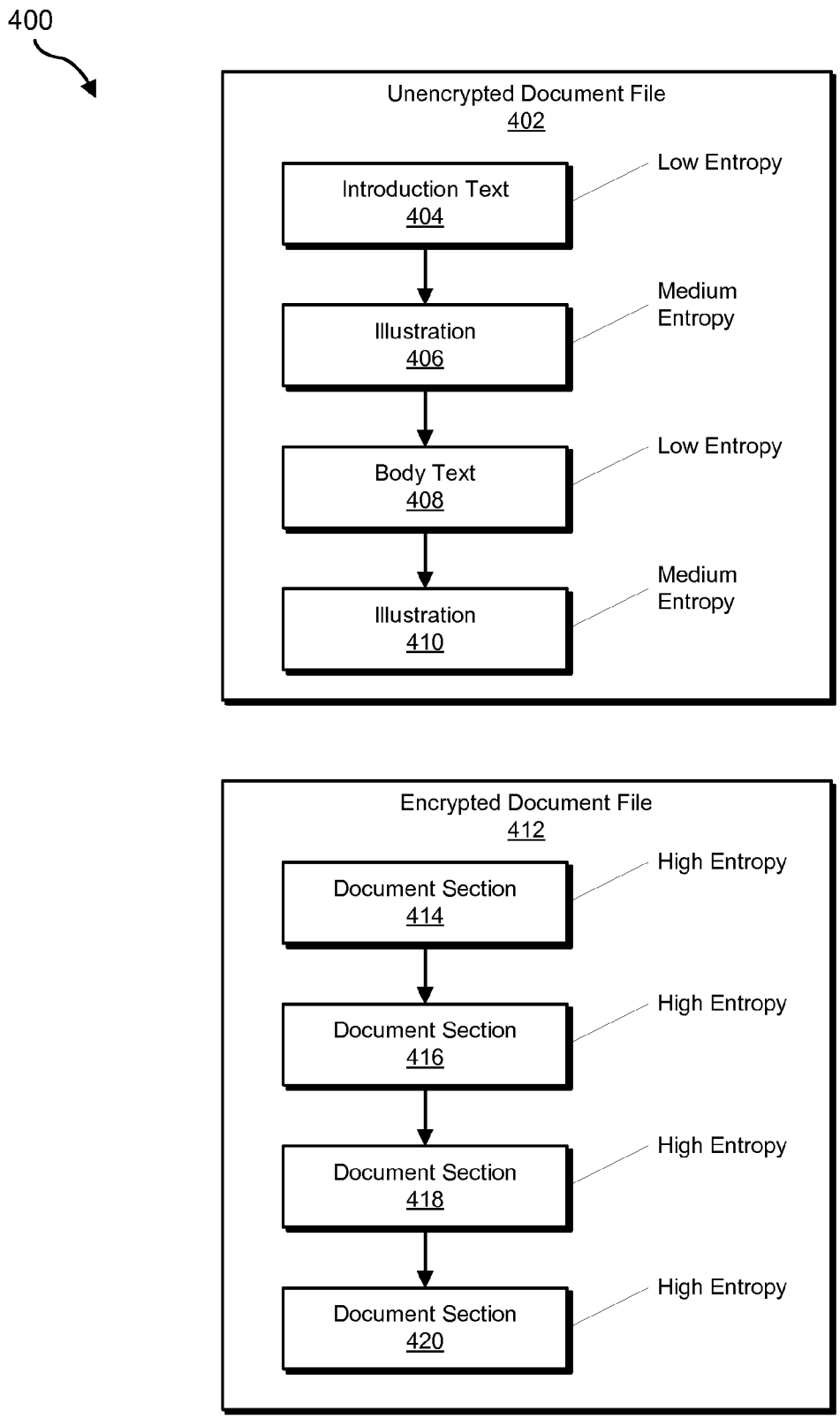
FIG. 4 is a block diagram of an exemplary computing system for protecting files from malicious encryption attempts.

The following will provide, with reference to FIGS. 1, 2, and 4, detailed descriptions of exemplary systems for protecting files from malicious encryption attempts. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting files from malicious encryption attempts. As illustrated in this figure, exemplary system 100 may include one or more modules 102 for performing one or more tasks. For example, and as will be explained in greater detail below, exemplary system 100 may include a detection module 104 that may detect an attempt to alter a file. Exemplary system 100 may additionally include an identification module 106 that may identify at least one characteristic of the attempt to alter the file. Exemplary system 100 may also include a determination module 108 that may determine, based on the characteristic of the attempt to alter the file, that the attempt to alter the file represents a malicious attempt by a third party to encrypt the file. Exemplary system 100 may additionally include a security module 110 that may perform a security action in response to determining that the attempt to alter the file represents a malicious attempt by the third party to encrypt the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to protect files from malicious encryption attempts. For example, and as will be described in greater detail below, detection module 104 may detect an attempt 210 to alter a file 208. Next, identification module 106 may identify at least one characteristic 212 of attempt 210 to alter file 208. After characteristic 212 has been identified, determination module 108 may determine, based on characteristic 212 of attempt 210 to alter file 208, that attempt 210 to alter file 208 represents a malicious attempt by a third party to encrypt file 208. Finally, security module 110 may perform a security action 216 in response to determining that attempt 210 to alter file 208 represents a malicious attempt by the third party to encrypt file 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

FIG. 3 is a flow diagram of an exemplary computer-implemented method 300 for protecting files from malicious encryption attempts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect an attempt to alter a file. For example, at step 302 detection module 104 may, as part of computing device 202 in FIG. 2, detect attempt 210 to alter file 208.

The phrase "attempt to alter a file," as used herein, generally refers to any action or series of actions that may result in the contents, headers, and/or metadata of a file being changed. Examples of an attempt to alter a file may include, without limitation, moving a file, renaming a file, encrypting a file, changing the format of a file, editing a file, and/or deleting a file. For example, an attempt to alter a file may include editing a document in a document editor.

Detection module 104 may detect the attempt to edit the file in a variety of ways and/or contexts. In some embodiments, detection module 104 may detect the attempt to alter the file by intercepting the attempt to alter the file using a device driver. In some examples, detection module 104 may include a device driver filter that may modify the behavior of a device that stores files, such as a disk drive. In one example, detection module 104 may modify the disk drive to forward write attempts to a security system that may analyze the write attempts in order to determine if they represent malicious attempts to encrypt a file.

Additionally or alternatively, detection module 104 may detect the attempt to alter the file by intercepting the attempt to alter the file using a hook, such as an interception hook in user-mode. For example, a hook may be placed into a file alteration function of an application. A hook may be added into an application's code before the code is compiled and/or added dynamically at run time. In some examples, when the application attempts to alter a file the hook may be called and may then perform additional functions, such as analyzing the attempt to alter the file, in order to determine if attempt represents a malicious attempt to encrypt the file.

At step 304, one or more of the systems described herein may identify at least one characteristic of the attempt to alter the file. For example, at step 304 identification module 106 may, as part of computing device 202 in FIG. 2, identify at least one characteristic 212 of attempt 210 to alter file 208.

The term "characteristic," as used herein, generally refers to any attribute of the attempt to alter the file, the state of the file should the attempt succeed, and/or the file itself. Examples of such characteristics may include, without limitation, file size, file type, file headers, file content, change in file size potentially caused by the attempt, change in file type potentially caused by the attempt, change in file headers potentially caused by the attempt, and/or change in file content or attributes of file content potentially caused by the attempt.

Identification module 106 may identify the characteristic in a variety of ways and contexts. For example, identification module 106 may analyze the file in order to identify the characteristic. In some embodiments, identification module 106 may identify the characteristic by analyzing a temporary file created by applying the attempt to alter the file to a copy of the file. Identification module 106 may execute from a variety of locations, including on a local server and/or on a remote server.

In some examples, identification module 106 may identify the characteristic of the attempt to alter the file by determining that the attempt includes an attempt to alter a header of the file. Files may include information in a file header that indicates the file's type. If the file is encrypted, this information may no longer be readable and/or present. In some examples, identification module 106 may determine that the attempt to alter the file may cause the type information in the file header to no longer match the file's type and/or remove the file type information in the file header.

At step 306, one or more of the systems described herein may determine, based on the characteristic of the attempt to alter the file, that the attempt to alter the file represents a malicious attempt by a third party to encrypt the file. For example, at step 306 determination module 108 may, as part of computing device 202 in FIG. 2, determine, based on characteristic 212 of attempt 210 to alter file 208, that attempt 210 to alter file 208 represents a malicious attempt by a third party to encrypt file 208.

The term "malicious attempt," as used herein, generally refers to any attempt to alter a file that is instigated by a malicious third party that does not legitimately own the file. In one embodiment, the malicious attempt by the third party to encrypt the file may include an attempt to prevent a legitimate user from accessing the file. For example, the malicious attempt by the third party may be part of a ransomware scheme that encrypts important files and holds them for ransom.

Determination module 108 may determine that the attempt represents a malicious attempt by a third party to encrypt the file in a variety of ways. For example, determination module 108 may subject the attempt to one or more heuristics that may indicate that the attempt has a high probability of being a malicious encryption attempt.

In one embodiment, identification module 106 may identify the characteristic by identifying an original entropy level of content of the file. In this embodiment, determination module 108 may determine that the attempt to alter the file represents a malicious attempt by determining that the attempt to alter the file introduces a high level of entropy. In this example, the high level of entropy may be greater than the original entropy level of the content of the file. The term "entropy" or "entropy level," as used herein, generally refers to the level of unpredictability in information content.

Most document files include a consistent, low level of entropy throughout the contents of the document. Different types of content may have different entropy, but the overall structure of the document may still be very low entropy. Encrypted files, in contrast, typically feature a high level of entropy throughout the file. FIG. 4 is a block diagram of an exemplary computing system 400 for protecting files from malicious encryption attempts based on the entropy levels of files. As illustrated in FIG. 4, unencrypted document file 402 may include introduction text 404, illustration 406, body text 408, and/or illustration 410. Introduction text 404 and/or body text 408 may be low entropy. Illustrations 406 and/or 408 may be medium entropy due to the relatively complexity of images versus text. Encrypted document file 412 may include document sections 414, 416, 418 and/or 420, all of which may be high entropy. Because all of the sections of encrypted document file 412 are uniformly high entropy determination module 108 may determine that encrypted document file 412 is encrypted. As such, an attempt to alter unencrypted document 402 in a way that would introduce similarly high levels of entropy to those seen in encrypted document file 412 may be an attempt to encrypt unencrypted document 402.

In another embodiment, identification module 106 may identify the characteristic of the attempt to alter the file by identifying the file's type. In this embodiment, determination module 108 may determine that the attempt to alter the file represents a malicious attempt by determining that the attempt to alter the file is not consistent with the file's type. For example, the file may be a DOCX file that may be stored using an extensible markup language (XML) schema specific to DOCX files. In this example, determination module 108 may determine that the attempt to alter the file may alter the file in such a way that the contents of the file are no longer valid XML under the DOCX XML schema.

In one embodiment, identification module 106 may identify the characteristic of the attempt to alter the file by identifying the file's size. In this embodiment, determination module 108 may determine that the attempt to alter the file represents a malicious attempt by determining that the attempt to alter the file would change the size of the file by a predictable delta associated with an encryption scheme. For example, determination module 108 may determine that the attempt to alter the file would change the size of the file by an amount associated with an encryption scheme. In some examples, the amount of change in file size may be zero bytes.

In another embodiment, identification module 106 may identify the characteristic of the attempt to alter the file by identifying a proportion of the file affected by the attempt to alter the file. In this embodiment, determination module 108 may determine that the attempt to alter the file represents a malicious attempt by determining that the proportion of the file exceeds a predetermined threshold for proportions of the file affected by benign attempts to alter the file. Examples of a predetermined threshold may include 20% of the file, 50% of the file, 80% of the file, 512 bytes of the file, and/or 2 megabytes of the file. In some embodiments, determination module 108 may use different predetermined thresholds in different circumstances. In some examples, the predetermined threshold may be determined based at least in part on the file's type. For example, a text file may have a lower predetermined threshold than an image file that may be expected to be subject to benign edits that may alter significant portions of the file. By using different predetermined thresholds for these file types, determination module 108 may be more likely to correctly identify attempts to encrypt text files without reporting a high number of false positives for image files.

In one embodiment, identification module 106 may identify the characteristic of the attempt to alter the file by identifying the file's type. In this embodiment, determination module 108 may determine that the attempt to alter the file represents a malicious attempt by determining that an editor and/or editing process performing the attempt to alter the file is not commonly associated with the file's type. For example, identification module 106 may identify the file as being a document file and determination module 108 may determine that the file is being edited by a program not normally used to edit documents, that the that the file is being edited by a program that may have been compromised by a malicious process, and/or that the file is being edited by an untrustworthy program that may have originated from an unknown source. Similarly, determination module 108 may determine that a web browser may be attempting to edit a DOC file.

Additionally or alternatively, determination module 108 may determine that the attempt to edit the file would cause the file to deviate from formatting rules associated with the file's type. For example, determination module 108 may determine that the attempt to edit the file will change the size, position of specific markers in a section, and/or relative position of specific patterns within the file that are characteristics of the file's type.

Returning to FIG. 3, at step 308 one or more of the systems described herein may perform a security action in response to determining that the attempt to alter the file represents a malicious attempt by the third party to encrypt the file. For example, at step 308 security module 110 may, as part of computing device 202 in FIG. 2, perform security action 216 in response to determining that attempt 210 to alter file 208 represents a malicious attempt by the third party to encrypt file 208.

Security module 110 may perform the security action in a variety of ways. In some examples, security module 110 may perform the security action by blocking the malicious attempt by the third party to encrypt the file, creating a backup copy of the file targeted by the malicious attempt, and/or alerting a user to the malicious attempt to encrypt the file. For example, security module 110 may discard the command intercepted by detection module 104. In another example, security module 110 may allow the encryption of the file to proceed but may create a backup copy of the file that can be restored by a user if the encryption attempt is determined to be malicious. Security module 110 may also alert the user that a potentially malicious encryption action is being performed on the file. In this example, the user may be given the option to view the application that is performing the encryption attempt, cancel the encryption attempt, and/or create a backup of the file that is being targeted by the encryption attempt.

Figure 5:
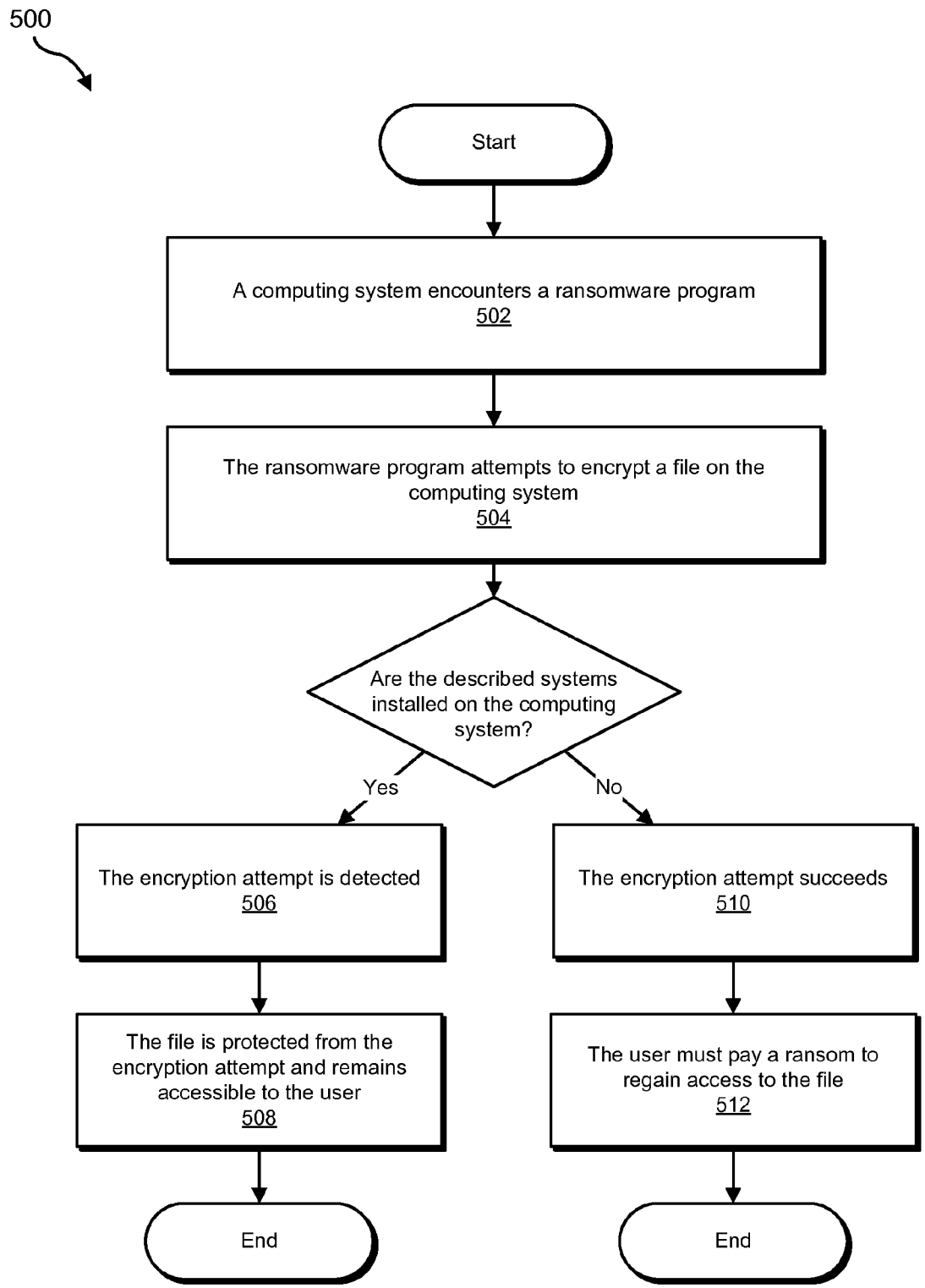
FIG. 5 is a flow diagram of an exemplary method for protecting files from malicious encryption attempts.

Malicious encryption attempts may often be caused by ransomware. FIG. 5 is a flow diagram of an exemplary method 500 for protecting files from malicious encryption attempts caused by ransomware. As illustrated in FIG. 5, at step 502 a computing system may encounter a ransomware program. The ransomware may have been inadvertently downloaded from the Internet and/or may have infected the computing system via a local network and/or portable storage device. At step 504, the ransomware program may attempt to encrypt a file on the computing system. Ransomware programs may target crucial operating system files that may significantly reduce the usability of the system if encrypted, files that appear to include valuable data, and/or indiscriminate files.

If the systems described herein are installed on the computing system, then at step 506 the encryption attempt may be detected. Following this, at step 508 the file may be protected from the encryption attempt and may remain accessible to the user. In some examples, the ransomware program may also be identified and/or uninstalled at step 508.

If the systems described herein are not installed on the computing system, then at step 510 the encryption attempt may succeed. In some examples, the ransomware may then inform the user that important files have been encrypted and will only be decrypted after a ransom is paid to the ransomware developer. At step 512, the user may have to pay the ransom to regain access to the file. Some users may pursue other avenues to attempt to restore the files that may be costly and/or time-consuming.

As explained above in connection with method 300 in FIG. 3, the systems described herein may detect an attempt to modify a file and examine this attempt to determine whether it represents a malicious encryption attempt. The systems described herein may detect the attempt in various ways, including intercepting the attempt with a hook and/or device driver filter. A number of different heuristics may also be applied to the attempt individually or in combination, including analyzing the file's type, the file's header, the portion of the file being modified, the entropy level of the file, the change in file size potentially caused by the modification, and/or the editor used to modify the file.

If the systems described herein determine that the attempt to modify the file represents a malicious attempt to encrypt the file potentially caused by ransomware, various security actions may result. For example, the systems described herein may protect the file from the encryption attempt by blocking the attempt and/or creating a backup of the unencrypted file. In some examples, the systems described herein may also warn the user about the encryption attempt and/or inform the user that ransomware may be installed on the computing system. By blocking malicious encryption attempts and warning users about ransomware, the systems described herein may protect valuable files from ransomware and prevent users from being forced to pay ransom to malicious developers in order to regain access to their files.

Figure 6:
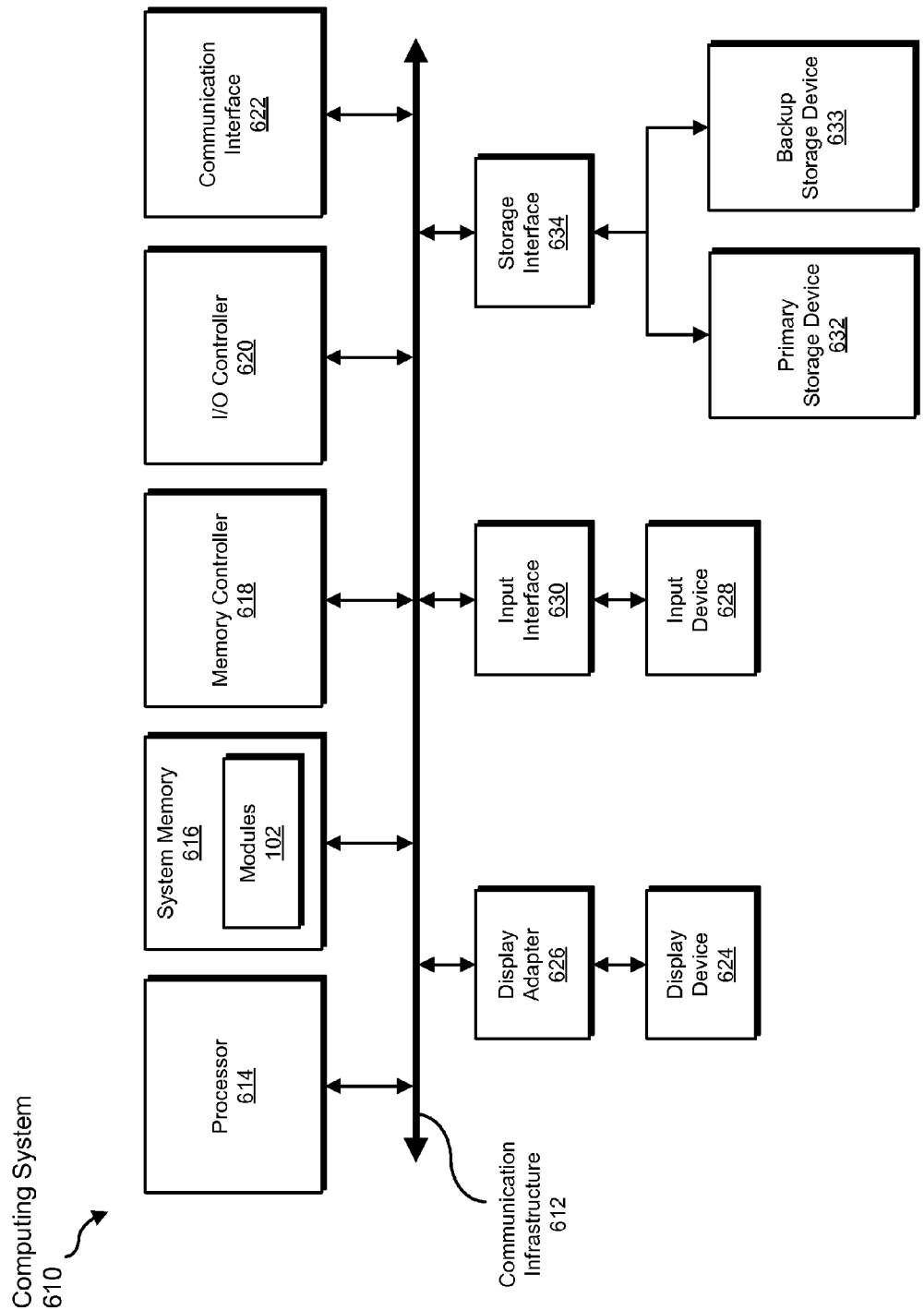
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
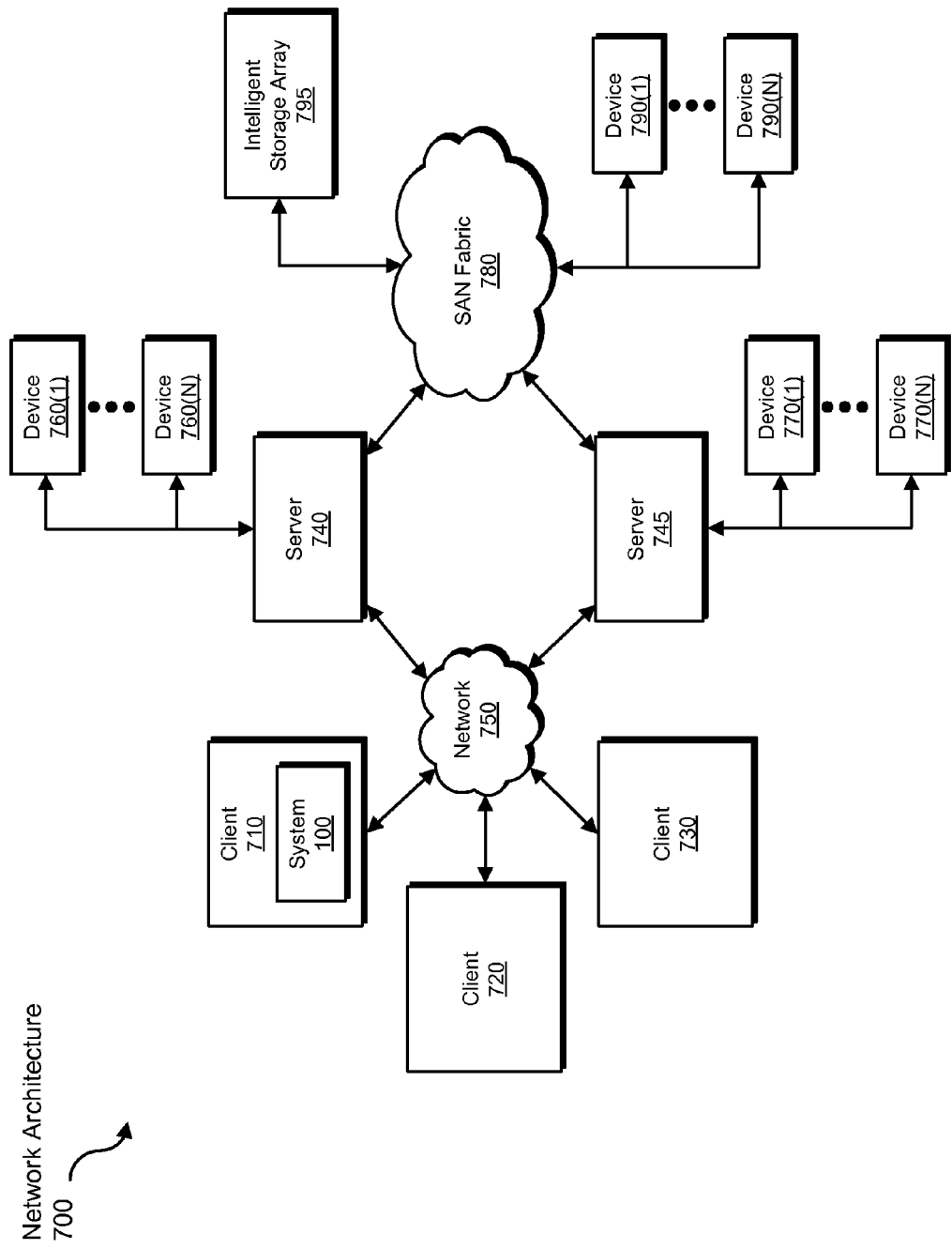
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting files from malicious encryption attempts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file data to be transformed, transform the file data, output a result of the transformation to a heuristic, use the result of the transformation to determine if an attempt to edit the file represents a malicious encryption attempt, and store the result of the transformation to a security system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting files from malicious encryption attempts, at least a portion of the method being performed by a computing device comprising at least one processor, the method comprising:
   detecting, using a filter that monitors activity on the computing device, an attempt to alter a file stored on the computing device;
   identifying at least one characteristic of the attempt to alter the file;
   determining, based on the characteristic of the attempt to alter the file, that the attempt to alter the file comprises a malicious attempt by a third party, which is not a legitimate owner of the file, to encrypt the file in a manner that would prevent the legitimate owner of the file from both decrypting and accessing the file; and
   performing, in response to determining that the attempt to alter the file comprises the malicious attempt by the third party to encrypt the file, a security action that allows the legitimate owner to continue to access an unencrypted version of the file despite the malicious attempt by the third party to encrypt the file.

2. The computer-implemented method of claim 1, wherein performing the security action comprises at least one of:
   blocking the malicious attempt by the third party to encrypt the file;
   creating a backup copy of the file targeted by the malicious attempt; and
   alerting a user to the malicious attempt to encrypt the file.

3. The computer-implemented method of claim 1, wherein the characteristic of the attempt to alter the file comprises at least one of:
   an attribute of the attempt to alter the file;
   an attribute of a potential state of the file in the event the attempt is successful; and
   an attribute of the file.

4. The computer-implemented method of claim 1, wherein:
   identifying the characteristic of the attempt to alter the file comprises identifying an original entropy level of content of the file; and
   determining that the attempt to alter the file comprises the malicious attempt comprises determining that the attempt to alter the file introduces a high level of entropy to the content that is greater than the original entropy level of the content of the file.

5. The computer-implemented method of claim 1, wherein identifying the characteristic of the attempt to alter the file comprises determining that the attempt comprises an alteration of a header of the file.

6. The computer-implemented method of claim 1, wherein:
   identifying the characteristic of the attempt to alter the file comprises identifying a type of the file; and
   determining that the attempt to alter the file comprises the malicious attempt comprises determining that the attempt to alter the file is not consistent with the type of the file.

7. The computer-implemented method of claim 1, wherein:
   identifying the characteristic of the attempt to alter the file comprises identifying a size of the file; and
   determining that the attempt to alter the file comprises the malicious attempt comprises determining that the attempt to alter the file would change the size of the file by a predictable delta associated with an encryption scheme.

8. The computer-implemented method of claim 1, wherein:
   identifying the characteristic of the attempt to alter the file comprises identifying a proportion of the file affected by the attempt to alter the file; and
   determining that the attempt to alter the file comprises the malicious attempt comprises determining that the proportion of the file exceeds a predetermined threshold for proportions of the file affected by benign attempts to alter the file.

9. The computer-implemented method of claim 1, wherein:
   identifying the characteristic of the attempt to alter the file comprises identifying a type of the file; and
   determining that the attempt to alter the file comprises the malicious attempt comprises:
      determining that an editor performing the attempt to alter the file is not commonly associated with the type of the file; and
      determining that an editor performing the attempt to alter the file is untrusted.

10. The computer-implemented method of claim 1, wherein detecting the attempt to alter the file comprises intercepting the attempt to alter the file using a device driver.

11. The computer-implemented method of claim 1, wherein detecting the attempt to alter the file comprises intercepting the attempt to alter the file using a user-mode interception hook.

12. A system for protecting files from malicious encryption attempts, the system comprising:
   a detection module, stored in memory on a computing device, that detects, using a filter that monitors activity on the computing device, an attempt to alter a file on the computing device;
   an identification module, stored in memory, that identifies at least one characteristic of the attempt to alter the file;
   a determination module, stored in memory, that determines, based on the characteristic of the attempt to alter the file, that the attempt to alter the file comprises a malicious attempt by a third party, which is not a legitimate owner of the file, to encrypt the file in a manner that would prevent the legitimate owner of the file from both decrypting and accessing the file;
   a security module, stored in memory, that performs, in response to determining that the attempt to alter the file comprises the malicious attempt by the third party to encrypt the file, a security action that allows the legitimate owner to continue to access an unencrypted version of the file despite the malicious attempt by the third party to encrypt the file; and
   at least one physical processor configured to execute the detection module, the identification module, the determination module, and the security module.

13. The system of claim 12, wherein the security module performs the security action by at least one of:
   blocking the malicious attempt by the third party to encrypt the file;
   creating a backup copy of the file targeted by the malicious attempt; and
   alerting a user to the malicious attempt to encrypt the file.

14. The system of claim 12, wherein the malicious attempt by the third party to encrypt the file comprises an attempt to prevent a legitimate user from accessing the file to coerce the legitimate user to pay a ransom to the third party in return for the third party de-encrypting the file.

15. The system of claim 12, wherein:
   the identification module identifies the characteristic of the attempt to alter the file by identifying an original entropy level of content of the file; and
   the determination module determines that the attempt to alter the file comprises the malicious attempt by determining that the attempt to alter the file introduces a high level of entropy to the content that is greater than the original entropy level of the content of the file.

16. The system of claim 12, wherein the identification module identifies the characteristic of the attempt to alter the file by determining that the attempt comprises an alteration of a header of the file.

17. The system of claim 12, wherein:
   the identification module identifies the characteristic of the attempt to alter the file by identifying a type of the file; and
   the determination module determines that the attempt to alter the file comprises the malicious attempt by determining that the attempt to alter the file is not consistent with the type of the file.

18. The system of claim 12, wherein:
   the identification module identifies the characteristic of the attempt to alter the file by identifying a size of the file; and
   the determination module determines that the attempt to alter the file comprises the malicious attempt by determining that the attempt to alter the file would change the size of the file by a predictable delta associated with an encryption scheme.

19. The system of claim 12, wherein:
   the identification module identifies the characteristic of the attempt to alter the file by identifying a proportion of the file affected by the attempt to alter the file; and
   the determination module determines that the attempt to alter the file comprises the malicious attempt by determining that the proportion of the file exceeds a predetermined threshold for proportions of the file affected by benign attempts to alter the file.

20. A non-transitory computer-readable medium comprising one or more computer-readable instructions that, when executed by at least one processor of a computing device, cause the computing device to:
   detect, using a filter that monitors activity on the computing device, an attempt to alter a file stored on the computing device;
   identify at least one characteristic of the attempt to alter the file;
   determine, based on the characteristic of the attempt to alter the file, that the attempt to alter the file comprises a malicious attempt by a third party, which is not a legitimate owner of the file, to encrypt the file in a manner that would prevent the legitimate owner of the file from both decrypting and accessing the file; and
   perform, in response to determining that the attempt to alter the file comprises the malicious attempt by the third party to encrypt the file, a security action that allows the legitimate owner of the file to continue to access an unencrypted version of the file despite the malicious attempt by the third party to encrypt the file.

\* \* \* \* \*